Sept. 23, 1930. E. W. DUNBAR ET AL 1,776,353
PROCESS OF MAKING RUBBER SOLE STOCK
Filed June 20, 1924 2 Sheets-Sheet 1
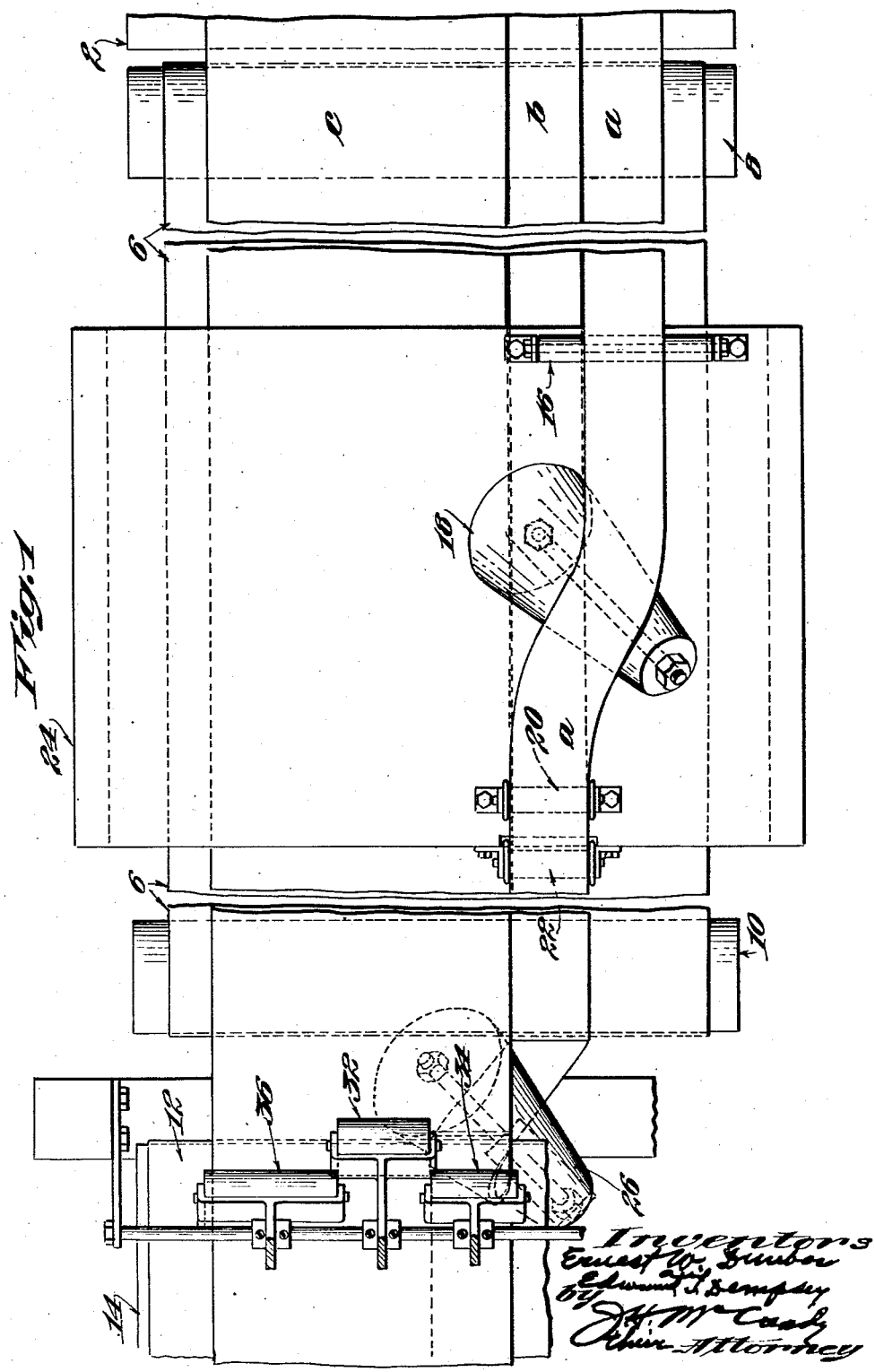

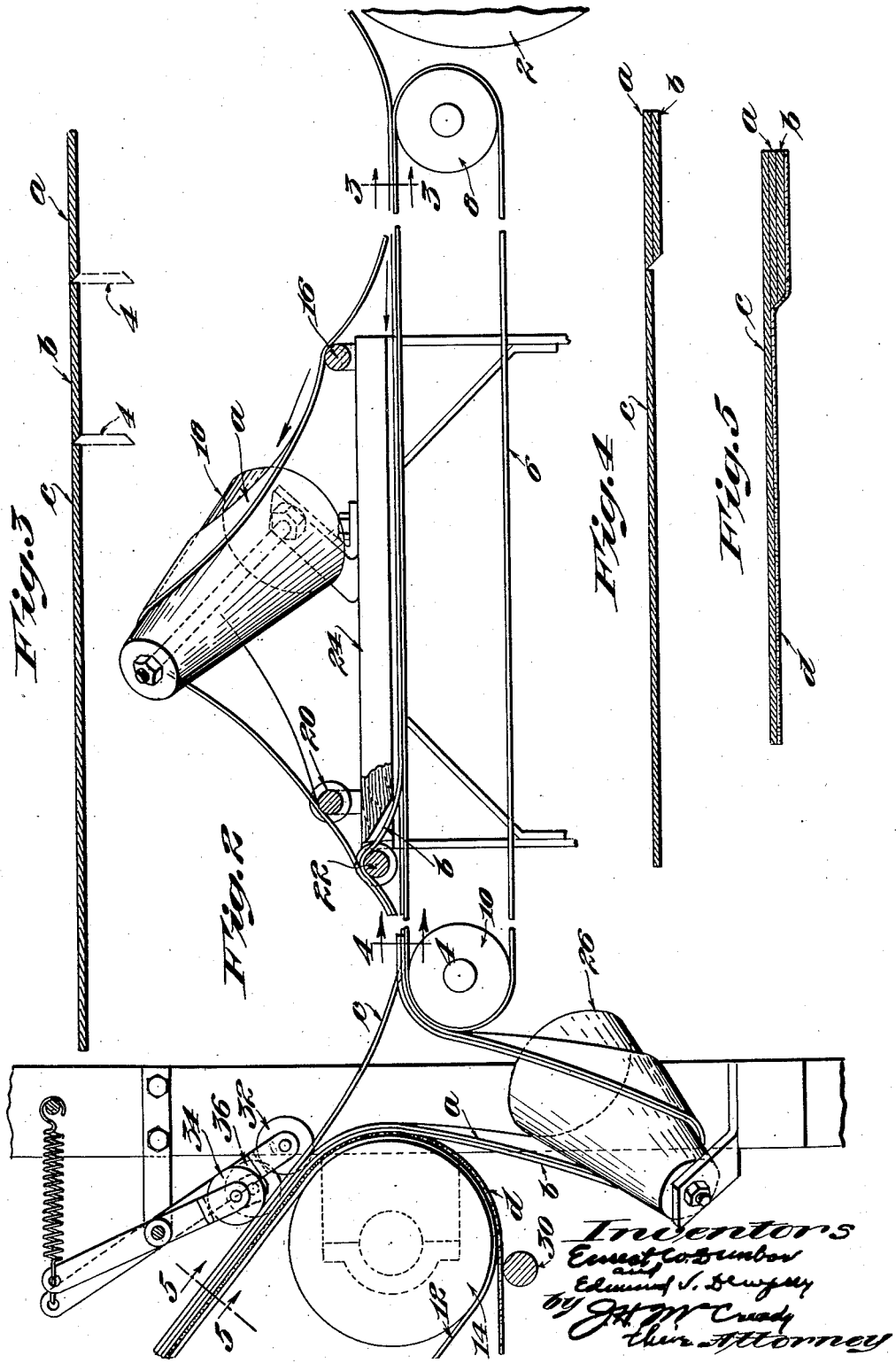

Patented Sept. 23, 1930

1,776,353

UNITED STATES PATENT OFFICE

ERNEST W. DUNBAR, OF HUDSON, AND EDMUND J. DEMPSEY, OF WEST MEDFORD, MASSACHUSETTS, ASSIGNORS TO CAMBRIDGE RUBBER COMPANY, OF CAMBRIDGE, MASSACHUSETTS, A CORPORATION OF MASSACHUSETTS

PROCESS OF MAKING RUBBER-SOLE STOCK

Application filed June 20, 1924. Serial No. 721,260.

It is customary to cut the soles for various kinds of rubber soled shoes out of sheeted rubber stock of substantially the thickness throughout the greater part of its width necessary for the forepart of the sole, and of a greater thickness at the margin for the heel end of the sole. This sole stock is usually built up of plies or sheets of rubber which are pressed together and united to form a sheet of the required thickness. It has been customary heretofore to make this rubber sheet stock by a "batch" process. A common practice has been to place sheets of rubber one upon the other to build up a rubber body of suitable thickness for the forepart of the sole, and then to add one or more additional plies of rubber to one margin of the strip to increase the thickness of this portion of the strip sufficiently for the heel end of the sole.

This process is open to the objection that it is relatively slow, it requires considerable space for the storing and handling of the stock, and it involves a great deal of hand labor. It is the chief object of the present invention, therefore, to improve both the processes of making rubber sole stock and also the apparatus used for this purpose with a view to expediting this operation and reducing the manufacturing expense. It is a particular object of the invention to devise a continuous process of making stock of this character, and to provide a suitable form of apparatus for practicing this process.

The nature of the invention will be readily understood from the following description when read in connection with the accompanying drawings, and the novel features will be particularly pointed out in the appended claims.

Referring now to the drawings,

Figure 1 is a plan view, somewhat diagrammatic, of an apparatus embodying this invention;

Fig. 2 is a side view of the apparatus shown in Fig. 1; and

Figs. 3, 4 and 5 are cross sectional views on the lines 3—3, 4—4, and 5—5, respectively, Fig. 2.

The composition of the rubber compound from which the stock is made may be of any suitable character, and it may be prepared and sheeted in the usual manner. In the drawings the numeral 2 designates one of the rolls of a rubber mill or calender in which this sheeting operation is performed in the customary manner, the sheet issuing from the mill being shown at $a$, $b$, $c$. According to the preferred process, this sheet is split immediately after it leaves the calender rolls by means of sharp edged rolls or cutters, such as those indicated at 4—4, Fig. 3, these cutters being in addition to the usual edge trimming cutters which also may be employed, and which are not shown. In the present instance the sheet is divided into three separate strips, $a$, $b$, and $c$. The two strips $a$ and $b$ are each approximately equal in width to the length of a heel lift, while the strip $c$ is somewhat greater in width than the maximum length of a sole. All three of these strips pass from the calender rolls on to the upper reach of a travelling apron or conveyor 6 supported on rolls 8 and 10, and the strip $c$ passes off the end of this apron and on to a conveyor belt 12, one end of which is supported on a roll 14.

The narrow strip $a$ is superposed upon the strip $b$ and for this purpose it is led over an idler roll 16 and a conical roll 18 to a flanged guide roll 20, and thence over another flanged guide roll 22 where it meets the other narrow strip $b$. The rolls just mentioned are all supported on a table 24 under which the apron 6 travels, and the strip $b$ rests on the apron until just before it reaches the roll 22. The movement of the strip $a$ into alinement with the strip $b$ is facilitated by the use of the conical roll 18 which, due to the difference in diameters of the parts thereof engaged by the strip and to the inclination of the axis of the roll, tends to shift the strip laterally. The guiding of the strip further is facilitated by the flanges on the ends of the roll 20. Both of the strips $a$ and $b$, while still maintaining their superposed relationship, next travel off the end of the apron 6, are guided around another conical roll 26 and are brought up under the margin of the strip $c$ at about the point where this strip engages the conveyor 12.

The steps of the process up to this point are indicated in Figs. 3, 4 and 5, Fig. 3 showing the sheet of rubber as it is split or divided by the cutters 4—4 into the three strips $a$, $b$ and $c$, Fig. 4 showing the relative positions of these strips after the strip $a$ has been superposed on the strip $b$, and Fig. 5 illustrating the relationship after the two superposed strips $a$ and $b$ have been secured on the margin of the main strip $c$. Preferably the cutters 4—4 which divide the sheet of rubber into strips are arranged to bevel the edges of the strips $a$ and $b$, as clearly shown in Fig. 3, so that when these strips are assembled, as shown in Figs. 4 and 5, the bevelled edges will register and give the inclination desired for the forward or breast edge of the heel, these bevelled edges lying inwardly away from the right-hand edge, Fig. 5, of the main strip $c$ toward the opposite edge of said strip $c$.

In some cases it is desirable to add another ply of rubber to those already assembled, and this additional sheet of rubber may bear an embossing, or may consists of crepe rubber, or be of a different character from that of the other plies previously assembled. Such a ply is indicated at $d$ in Fig. 5, and it is designed to form the outer surface of the shoe sole. This additional or outer strip $d$ may be either unwound from the roll or supplied from another calender, if the nature of the material permits. Fig. 2 shows the strip $d$ being guided over a roll 30 and meeting the strips $a$ and $b$ just before they come in contact with the strip $c$. All of these strips are then pressed together by rolls 32, 34 and 36, the roll 32 being located in advance of the other two rolls and pressing the sheets $c$ and $d$ together immediately in front of the bevelled edges of the strips $a$ and $b$. This pressure also secures the strip $d$ to said bevelled edges. The roll 34 bears on the part of the composite strip which includes the strips $a$ and $b$, while the roll 36 bears on the opposite margin, all three of the rolls being held against the stock by spring pressure so that the plies are united securely together.

The stock is discharged at the upper or delivery end of the conveyor 12 where it is cut up into suitable lengths for subsequent delivery to the machines which cut out the soles. In cutting out the soles the usual practice is followed, the soles being cut transversely of the strip so that the forepart and shank of the sole are of a thickness equal to the combined thicknesses of the plies $c$ and $d$, Fig. 5, while the heel end of the sole has a thickness equal to that of all four plies of stock.

It will be evident that this process is entirely continuous, it eliminates much of the handling that has been required by the processes previously used, and it is considerably more economical of floor space. The fact that all handling of the stock is eliminated between the calender and the point at which the sheeted stock is cut up into sections ready for the sole cutting operation, effects a very substantial economy in manufacturing cost over prior processes.

It will readily be appreciated that the process above described may be modified in many particulars without departing from its essential characteristics. For example, the number of plies which are united may be varied and much variation in this respect will be required by the nature of the shoe to which the sole is to be applied, a considerable variation in weight or thickness being necessary in different shoes. The invention is particularly valuable in the manufacture of crepe rubber soleing.

It will also be understood that the apparatus shown may be modified in many particulars without departing from the spirit or scope of the invention. For example, the conical rolls 18 and 26 may be replaced by cylindrical rolls having end flanges. While we have herein shown a convenient form of apparatus for practicing the process devised by this invention, it is contemplated that the process may be practiced with the aid of a great variety of forms of apparatus.

Having thus described our invention, what we desire to claim as new is:

1. That improvement in the process of making rubber sole stock for shoes, which consists in feeding three continuous strips of rubber stock, one of said strips being at least as wide as the length of the soles to be cut therefrom, the other strips being approximately equal in width to the length of heel lifts and having their edges bevelled, superposing said narrow strips one upon the other with said bevels registering, securing said superposed strips to one margin of the remaining strip with said bevelled edges lying toward the opposite edge of the latter strip, and performing said superposing and securing operations while continuing the feeding movements of all of said strips uninterruptedly.

2. In an apparatus for making rubber sole stock, the combination of a machine for working a rubber compound into the form of a continuous sheet, a travelling apron for feeding said sheet away from said machine, means for cutting said sheet into two continuous strips, one of said strips being at least as wide as the length of the soles to be cut therefrom, and the other at least as wide as the length of the heel lifts for said soles, the latter strip being bevelled, and means for guiding said narrower strip upon the edge portion of the wide strip and pressing it thereupon with the bevelled edge of the narrow strip lying inwardly toward the opposite edge of the wide strip.

3. In an apparatus for making rubber sole stock, the combination of a machine for working a rubber compound into the form of a continuous sheet, a travelling apron for feeding said sheet away from said machine, means for cutting said sheet to form two narrow strips and a wide strip, and devices for guiding said narrow strips to superpose one upon the other and to press both of them upon the margin of said wide strip.

4. In an apparatus for making rubber sole stock, the combination of a machine for working a rubber compound into the form of a continuous sheet, means for feeding said sheet away from the machine, means for cutting said sheet into continuous strips, one of said strips being substantially wider than the other, and guiding devices including rolls for guiding said narrow strip into superposed relationship to the margin of the wide strip and causing said strips to adhere to each other.

5. In an apparatus for making rubber sole stock, the combination of a machine for working a rubber compound into the form of a continuous sheet, means for feeding said sheet away from the machine, means for cutting said sheet into continuous strips, one of said strips being at least as wide as the length of a shoe sole and the other substantially as wide as the length of the heel for said sole, and means including a conical roll for guiding said narrow strip into superposed relationship to the wide strip and causing it to adhere to the marginal portion of the latter strip.

6. In an apparatus for making rubber sole stock, the combination of a machine for working a rubber compound into the form of a continuous sheet, means for feeding said sheet away from the machine, means for cutting said sheet into two narrow strips and a wide strip, guiding devices including a conical roll for guiding one of said narrow strips into superposed relationship to the other narrow strip, additional means including a conical roll for guiding the superposed narrow strips upon the margin of the wide strip, and rolls for pressing all of said strips together.

In testimony whereof we have hereunto signed our names to this specification.

ERNEST W. DUNBAR.
EDMUND J. DEMPSEY.